United States Patent [19]
Ezaki

[11] Patent Number: 4,789,905
[45] Date of Patent: Dec. 6, 1988

[54] OUTPUT SIGNAL SWITCHING CIRCUIT FOR A VIDEO TAPE RECORDER

[75] Inventor: Tadashi Ezaki, Tokyo, Japan

[73] Assignee: Sony Corporation, Tokyo, Japan

[21] Appl. No.: 28,703

[22] Filed: Mar. 20, 1987

[30] Foreign Application Priority Data

Apr. 15, 1986 [JP]  Japan .................................. 61-86726

[51] Int. Cl.[4] .............................................. A04N 5/91
[52] U.S. Cl. .................................... 358/335; 358/181;
360/33.1; 360/31; 360/61
[58] Field of Search ....................... 358/181, 188, 335;
340/500; 360/33.1, 31, 61; 369/10, 11, 53

[56] References Cited
U.S. PATENT DOCUMENTS 4,527,204  7/1985  Kyzaboi .......................... 360/33.1
4,630,133 12/1986  Long ............................... 360/33.1

*Primary Examiner*—Alan Faber

[57] ABSTRACT

An output signal switching circuit for a video tape recorder which has an RF signal changeover switch which is automatically connected to the output terminal of an RF converter during reproduction mode and the video tape recorder is prevented from being automatically switched when a connecting line is connected to a composite video or base band video signal output terminal, thus assuring that the video tape recorder is easier to operate than prior art systems.

7 Claims, 2 Drawing Sheets

OUTPUT SIGNAL SWITCHING CIRCUIT FOR A VIDEO TAPE RECORDER

BACKGROUND OF THE INVENTION

1. Field of the Invention

This invention relates in general to output circuits for video tape recorders and particularly to an output signal switching circuit which supplies an output signal from a video tape recorder to other apparatus such as a television receiver.

2. Description of the Prior Art

In commercially available video tape recorders (VTR), during reproduction, a video signal and an audio signal which are reproduced from magnetic tape are remodulated to form a composite RF signal according to a broadcasting modulation system. Such RF signal has a frequency band of a vacant channel, that is a channel where no standard broadcast signals are being received, and such RF signal is supplied to an antenna terminal of a television receiver. The television receiver is capable of receiving not only standard broadcast signals, but also receives the described reproduced signal and operates with the circuit arrangement illustrated in FIG. 1.

FIG. 1 illustrates in block an example of a prior art system wherein an input terminal 51 of a VTR receives an RF signal from an antenna, not shown. The signal applied to the input terminal 51 is supplied to a VTR tuner 52 which is tuned to receive a desired broadcast signal. The tuner 52 produces video and audio signals by demodulating the incoming signal and supplies the video signal to a video processor circuit 53 and the audio signal to an audio processing circuit 54 of the VTR. The video circuit 53 and the audio circuit 54 include tape head systems for recording and reproducing signals.

The video signal and the audio signal from the video and audio processor circuits 53 and 54 are supplied to an RF converter 55 in which they are formed into a signal which complies with the broadcasting system so as to produce an RF signal with the carrier of the vacant channel. The RF signal output of the RF converter 55 is connected to a first fixed terminal 56a of an RF signal changeover switch 56.

The RF signal from the input terminal 51 is supplied to a second fixed terminal 56b of the switch 56 as illustrated. The moveable contact 56c of the switch 56 when connected to terminal 56a supplies the RF output signal to a RF output terminal of the VTR which is connected to an antenna input terminal of a television receiver 70. Switch 56 is designated a TV/video changeover switch.

According to the prior art device during reproduction, the signal is reproduced, for example, from the magnetic tape are or reformed as signals which comply with the broadcasting system by the video processor circuit 53 and the audio processor 54 and are converted to an RF signal at the frequency of the vacant channel by the RF converter 55 and then are fed through the fixed terminal 56a of the switch 56 to the television receiver 70. During other modes other than the reproduction mode, the moveable contact 56c of the switch 56 is connected to the fixed terminal 56b so as to supply the signal which is applied to the input terminal 51 to the television receiver 70. Thus, the signal reproduced from the VTR can be received and reproduced by the television receiver 70 and also the standard broadcast signals can be received by the television receiver under this condition.

In the circuit arrangement of the prior art, however, when the VTR is placed into the reproduction mode and the television receiver 70 is tuned to the vacant channel to allow watching of the reproduced signal on the television receiver, in the event the user forgets to move the moveable contact 56c to the fixed contact 56a at the output of the RF converter 55, a reproduced signal from the converter 55 will not be supplied to the television receiver 70 and thus a picture and sound will not be reproduced on the television receiver and only noise signals will occur which is undesirable.

Thus, in the prior art circuit arrangement, a switching control circuit 57 is usually provided to automatically control the switch 56. In such system, during reproduction mode, a signal is generated when the VTR is in a reproduction mode and such reproduction mode signal is applied to an input terminal 58 of a control circuit 57 so as to automatically cause the moveable contact 56c of the switch 56 to be moved to the fixed contact 56a to connect the output of the RF converter 55 to the television receiver during the reproduction mode of the VTR. If the switch 56 is controlled by the control circuit 57 so as to automatically switch the moveable contact 56c to the fixed the contact 56b which is connected to the input terminal 51 at the instant when the reproduction mode ends, when the television receiver 70 is tuned to the signal of the vacant channel, the television receiver will be supplied with the signal from the antenna which results in a signal having a high noise level being reproduced by the receiver 70. So as to prevent this mode of operation, the switch 56 is usually controlled by the control circuit 57 so as to connect its moveable contact 56c with the fixed terminal 56a at the output of the RF converter 55 only when the reproduction mode is again detected and the switch 56 is controlled by the control circuit 57 so that the moveable contact 56c is connected to the fixed terminal 56b which is connected to the input terminal 51 by supplying a manual operating signal to an input terminal 59 of the control circuit 57. The signal to the input terminal 59 may be supplied by a television/video switching control button or by a switch, not shown.

Recently, television receiver 70 have been designed to have line input terminals in addition to an antenna input terminal for the RF signals wherein composite video baseband video and baseband audio signals can be directly applied to the receiver so as to directly supply the video and audio signals in a baseband level. In such receivers since the video signal and the audio signal at the input of the RF converter 55 are respectively supplied to line output terminals 61 and 62 and such signals are supplied to the input terminals of the television receiver 70 and, thus, there is a less risk that such signals will be deteriorated by conversion and such signals can be accurately reproduced and received at the television receiver. During such operation, the antenna terminal of the television receiver 70 should also be connected to the RF output terminal 60 of the VTR so as to receive the RF signal from the input terminal 51.

In other words, the optimum RF signal should be supplied to the VTR when it is intended to record a signal. For this purpose, it is conventional that the television receiver 70 is connected to the RF output terminal 60 of the VTR and a distributor is provided at the stage before the tuner 52 of the VTR.

However, according to this described connection when the VTR is once placed in the reproduction mode, although the television receiver 70 is not conditioned to receive the signal of the vacant channel, the moveable contact 56c of the switch 56 is automatically connected to the fixed contact 56a at the output of the RF converter 55. Thus, the user must operate the television/video switching control button again so as to receive any selected broadcast channel with the television receiver after the reproduction mode has ended. Thus, the operating characteristic of the apparatus is not satisfactory.

According to the prior art described above, when the base band video and audio line output terminals of the VTR are connected to the line input terminals of the television receiver and the RF output terminal of the VTR is connected to the antenna terminal of the television receiver, if the VTR is set to the reproduction mode, the RF output terminal will unnecessarily be switched to the RF converter output. As a result, when the reproduction mode of the VTR ends the user has to manually perform an extra operation so as to obtain the original state of the switch which considerably deteriorates operation of the system.

SUMMARY OF THE INVENTION

It is an object of the present invention to provide an improved output signal switching circuit for a video tape recorder.

Another object of the invention is to provide an output signal switching circuit for a video tape recorder which makes the video tape recorder easier to operate.

According to one aspect of the invention, there is provided an output switching circuit for a video tape recorder which comprises:

(a) a switching means for selectively supplying a first RF signal from an antenna and a second RF signal produced by an RF converter of a VTR to an RF output terminal;

(b) a control means for detecting the reproduction mode of the video tape recorder and controlling the switching means so as to connect it to the second RF signal produced by the RF converter;

(c) means for supplying an input signal to the RF converter to a line output terminal;

(d) detecting means for detecting when the connection line is connected to the line output terminal; and (e) inhibiting means for inhibiting switching of the switching means when the reproduction mode is detected by using a signal from the detecting means.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 2:
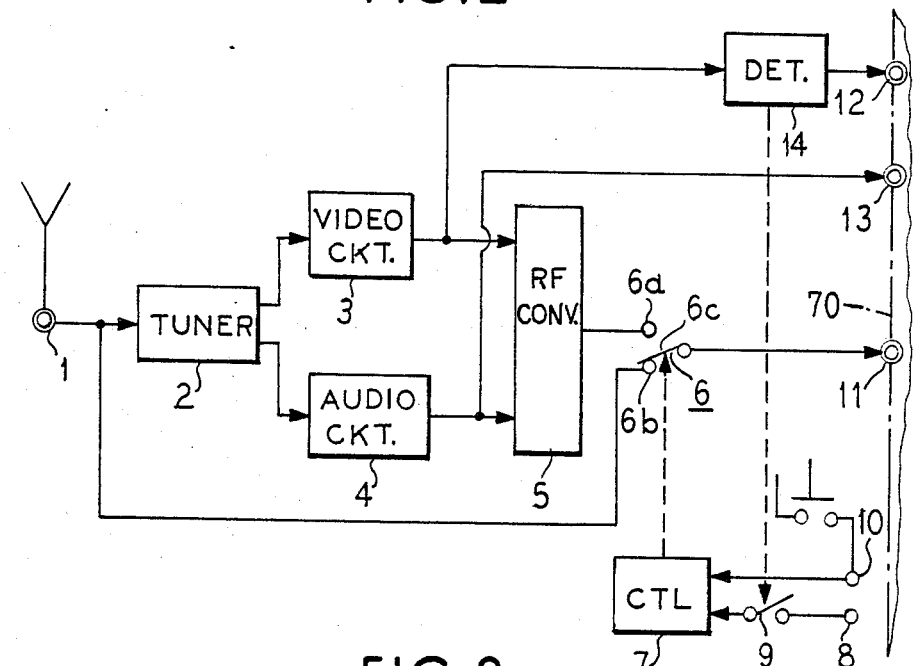
FIG. 2 is a block diagram showing an embodiment of an output signal switching circuit for a video tape recorder according to the present invention.
Figure 3:
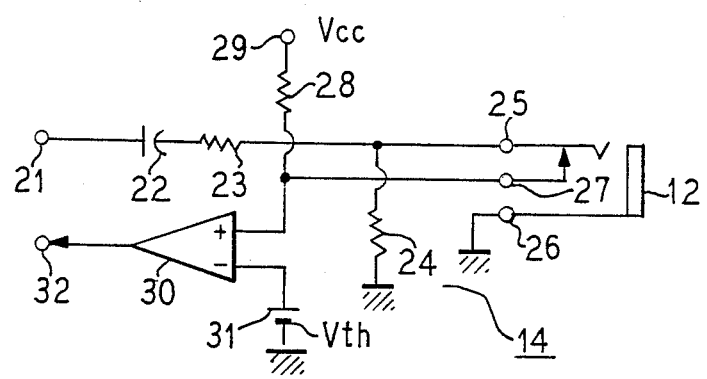
FIG. 3 is an electrical schematic diagram illustrating an example of a practical circuit for the detecting circuit used in the embodiment illustrated in FIG. 2.

An embodiment of the output signal switching circuit according to the invention is illustrated in FIGS. 2 and 3. FIG. 2 is a block diagram illustrating the embodiment of the invention and FIG. 3 is an electrical schematic illustrating the detecting circuit shown in FIG. 2.

In FIG. 2 an input terminal 1 is connected to an antenna which supplies an RF signal. The signal supplied to the input terminal 1 is supplied to a VTR tuner 2 which allows a desired broadcast signal to be received. The video signal and the audio signal received are demodulated by the tuner 2 and are respectively supplied to a video processor circuit 3 and to an audio processor circuit 4. The video and audio processor circuits 3 and 4 each include a head-tape system for recording and reproduction. The video signals from the video processor circuit 3 and the audio signals from the audio processor circuit 4 are supplied to an RF converter 5 wherein they are modulated on an RF signal so as to form a signal which complies with the broadcasting system and wherein the signals thus generated is converted to an RF signal for a vacant channel. The RF signal which is converted is supplied to one fixed terminal 6a of an RF signal changeover switch.

Figure 1:
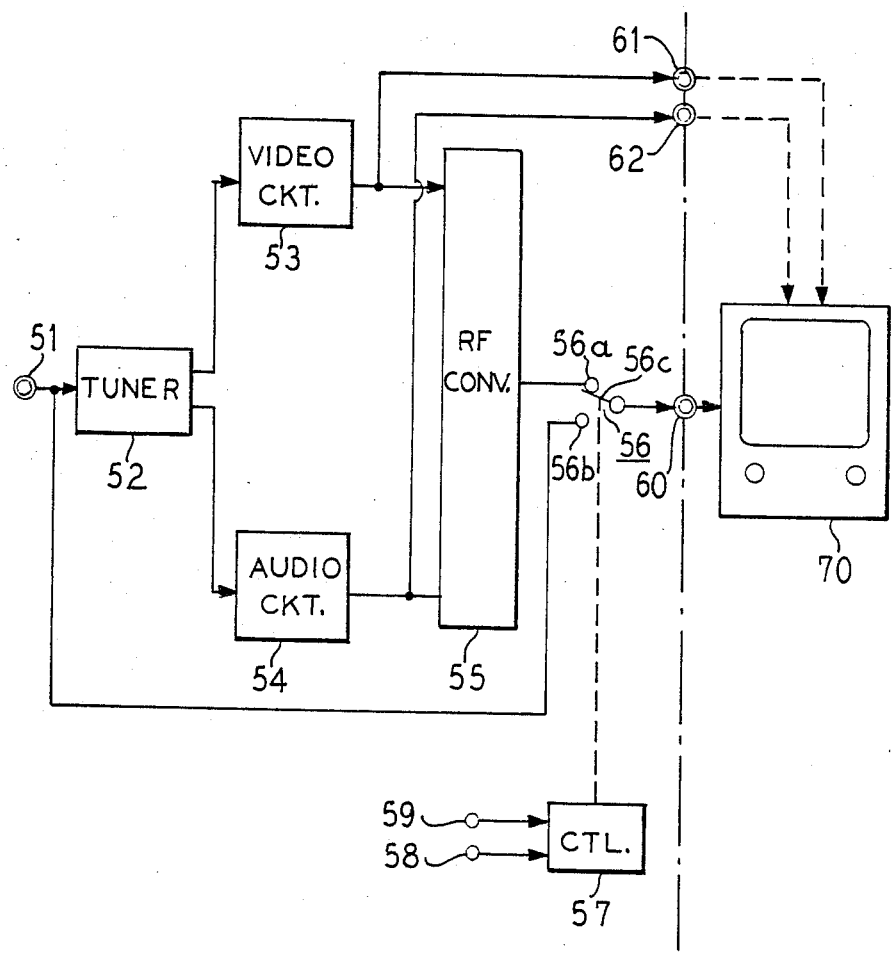
FIG. 1 is a block diagram illustrating a prior art switching system.

The RF signal which is supplied to the input terminal 1 is also directly supplied to the other fixed terminal 6b of the switch 6. The moveable contact 6c of the switch 6 is controlled by a switching control signal from a control circuit 7. The control circuit 7 can be supplied with a reproduction mode detecting signal from a terminal 8 through a switch 9 and can also be supplied a signal from a television/video switching control button through terminal 10. A signal developed at the moveable contact 6c of the switch 6 is delivered to an RF output terminal 11 which is connected to the RF input terminal 60 of a television receiver 70 such as illustrated in FIG. 1.

The signals from the video processor circuit 3 and the audio processor circuit 4 are also respectively supplied to line output terminals or jacks 12 and 13 to which the TV set 70 can be connected. A detecting circuit 14 for detecting if a connection line is connected to the line output terminal 12 is connected between the video processor circuit 3 and the line output terminal 12. The switch 9 is controlled by the detector circuit 14 so that it is opened when a signal is produced by the detecting circuit 14.

In the circuit arrangement of FIG. 2, when the moveable contact 6c of the switch 6 is connected to the fixed terminal 6b which is connected to the input terminal 1, the RF signal applied to the input terminal 1 is supplied through the switch 6 to the line output terminal 11 and to the RF input terminal of the television receiver 70. When the VTR is placed into the reproduction mode and a connecting line is not connected to terminal 12, the switch 9 is closed by the detector 14 so as to allow the reproduction mode signal which is detected and applied to terminal 8 to be supplied to the control circuit 7 so that due to operation of the control circuit 7 the switch 6 will have its moveable contact 6c connected to fixed terminal 6a at the output of the RF converter 5 so as to supply the signal from the RF converter 5 to the line output terminal 11. When the connection line of the TV receiver is connected to the line output terminal 12, the switch 9 will be opened by the detected signal from the detecting circuit 14 so that the control circuit 7 does not operate even during reproduction mode and thus leaves the moveable contact 6c of the switch 6 connected to fixed terminal 6b which is connected to the input terminal 1.

In this manner, the RF signal at terminal 1 is supplied to the output terminal 11 and the video signal and the audio signals are respectively supplied to the line output terminals or jacks 12 and 13.

With the described circuit arrangement, when the line output terminals 12 and 13 of the VTR are connected to the line input terminals of the television receiver 70 and the RF output terminal of the VTR is connected to the antenna terminal of the television receiver, even if the VTR is placed into the reproduction mode, the RF signal changeover switch is prevented from being unnecessarily switched and the user does not have to accomplish extra operations at the end of the reproduction mode and the operation of the system is considerably improved.

FIG. 3 illustrates an electrical schematic of the detecting circuit 14 of FIG. 2. In FIG. 3, an input terminal 21 receives the video signal from the video processor circuit 3 of FIG. 2. The input terminal 21 is grounded through a capacitor 22 and resistors 23 and 24. The junction point between the resistors 23 and 24 is connected to a terminal 25 which is connected to a central conductive terminal of a jack of the line output terminal 12. A terminal 26 is connected to the outer conductive member of jack 12 and is grounded. The jack 12 has a terminal 27 which is normally connected to the terminal 25 to short these terminals out, but which is disconnected from the terminal 25 when a male plug of a connecting line is inserted into the jack 12. The terminal 27 is connected through a resistor 28 to a power supply terminal 29 which receives a voltage Vcc. The terminal 27 is also connected to the positive input terminal of a comparator 30. A reference voltage source 31 of a reference voltage Vth is connected to the negative reference input terminal of the comparator 30. The output terminal 32 of the comparator 30 is connected to the control section of the switch 9 shown in FIG. 2.

With the circuit arrangement shown in FIG. 3, when the plug of the connection line is not inserted into the jack 12, the DC voltage Vcc from the power supply terminal 29 is divided by resistors 28 and 24 and is then supplied to the comparator 30. Under these conditions, since the divided voltage is selected so as to be lower than the reference voltage Vth, the voltage or potential at the output terminal 32 will be low and the switch 9 shown in FIG. 2 will remain closed. When, on the other hand, the plug or jack is inserted into the jack 12, the path between the terminals 27 and 25 is disconnected or opened so that the voltage Vcc from the power supply terminal 29 is supplied to the terminal 30 through the resistor 28. Under this condition, since the reference voltage Vth is selected to be lower than the voltage Vcc and the condition Vcc greater than Vth is satisfied, the potential at the output terminal 32 will become high and the switch of FIG. 9 will be opened.

In this manner, the connection of the connection line to jack 12 is detected and the switch 9 is controlled. The switch 9 may be an electronic switch such as a transistor or the signal from terminal 32 may be supplied to a relay which actuates a mechanical switch 9.

According to the present invention, when it is detected that the connection line is connected to the line output terminal 12 of the VTR, the RF signal changeover switch (TV/video changeover switch) is prevented from being automatically switched during the reproduction mode such that when the television receiver is connected to the line output terminal unnecessary switching of the RF switch is prevented thus resulting in a video tape recorder which is easier to operate.

The above description is given for a single preferred embodiment of the invention, but will it be apparent that many modifications and variations could be effected by one skilled in the art without departing from the spirit or scope of the novel concepts of the invention and the scope of the invention should be determined only by the appended claims.

I claim as my invention:

1. An output signal switching circuit for a video recorder comprising:
   (a) a switching means for selectively supplying a first RF signal from an antenna or a second RF signal produced by an RF converter to an RF output terminal;
   (b) a control means for detecting when said video recorder is in the reproduction mode and connected to control said switching means so as to select said second RF signal;
   (c) means for supplying a signal from a stage before said RF converter to a line output terminal;
   (d) detecting means for detecting when a connection line is connected to said line output terminal; and
   (e) inhibiting means for inhibiting the switching of said switching means upon detection of the reproduction mode by said detecting means.

2. An output signal switching circuit as claimed in claim 1, in which said line output terminal means is a jack and when a plug is inserted into said jack, said detecting means detects such condition.

3. An output signal switching circuit as claimed in claim 2, in which said detecting means includes a comparing means to which a reference voltage is applied, and said comparing means changing its output voltage when said plug is inserted into said jack.

4. An output signal switching circuit as claimed in claim 3, in which said comprising means includes a voltage divider which is disconnected when said plug is inserted into said jack.

5. An output signal switching circuit as claimed in claim 1, in which said inhibiting means comprises a switch which inhibits a mode detection signal from being supplied to said control means.

6. An output signal switching circuit for a video recorder comprising, a source of incoming RF television signals, a tuner connected to said source of incoming RF television signals, a video processing circuit connected to said tuner and producing a video signal, an audio processing circuit connected to said tuner and producing an audio signal, an RF converter receiving outputs of said video and audio processing circuits, a first RF audio and video output terminal, a switch with its moveable contact connected to said first RF audio and video output terminal and having a first fixed contact connected to said source of incoming RF television signals and having a second fixed contact connected to the output of said RF converter, a control circuit connected to the moveable contact of said switch to control it, a second output video terminal, a detector connected between said video processing circuit and said second output video terminal and detecting when a mating jack is inserted into said second video output terminal and said detector connected to said control circuit to prevent it from operating to move said moveable contact of said switch.

7. An output switching circuit according to claim 6 wherein said detector includes a comparator which has a first input which receives a reference voltage, said second video output terminal connected to a second input of said comparator and a second reference voltage applied to said second input when a jack is inserted into said second video output terminal.

* * * * *